United States Patent
Perelman et al.

(10) Patent No.: US 9,471,557 B2
(45) Date of Patent: *Oct. 18, 2016

(54) CLIENT-SIDE MODIFICATION OF ELECTRONIC DOCUMENTS IN A CLIENT-SERVER ENVIRONMENT

(75) Inventors: Roberto Perelman, Sunnyvale, CA (US); Scott E. Petersen, Redwood City, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 13/360,364

(22) Filed: Jan. 27, 2012

(65) Prior Publication Data

US 2013/0212121 A1    Aug. 15, 2013

Related U.S. Application Data

(63) Continuation of application No. 10/006,260, filed on Nov. 2, 2001, now Pat. No. 8,131,815.

(51) Int. Cl.
  *G06F 15/16*    (2006.01)
  *G06F 17/24*    (2006.01)
  *G06F 17/21*    (2006.01)

(52) U.S. Cl.
  CPC .......... *G06F 17/243* (2013.01); *G06F 17/211* (2013.01)

(58) Field of Classification Search
  CPC ..... G06F 17/211; G06F 17/243; G06F 17/30
  USPC ................................................ 709/203, 246
  See application file for complete search history.

(56) References Cited

U.S. PATENT DOCUMENTS

| | | |
|---|---|---|
| 5,465,299 A | 11/1995 | Matsumoto et al. |
| 5,634,064 A | 5/1997 | Warnock et al. |
| 5,778,372 A | 7/1998 | Cordell et al. |
| 5,987,480 A | 11/1999 | Donohue et al. |
| 6,026,433 A | 2/2000 | Arlach et al. |
| 6,259,445 B1 | 7/2001 | Hennum et al. |
| 6,469,714 B2 | 10/2002 | Buxton et al. |
| 6,557,005 B1 | 4/2003 | Burget |
| 6,609,200 B2 | 8/2003 | Anderson et al. |

(Continued)

FOREIGN PATENT DOCUMENTS

WO    WO0051018 A2    8/2000

OTHER PUBLICATIONS

Abrams, et al. "UIML: An XML Language for Building Device Independent User Interfaces", printed Mar. 28, 2006.

(Continued)

*Primary Examiner* — Oanh Duong
(74) *Attorney, Agent, or Firm* — Finch & Maloney PLLC (57) ABSTRACT

Client-side modification of electronic documents by server-generated instructions in a client-server environment enables dynamic modification of formatting information in an electronic document to accommodate new data received from the server. A server generates machine instructions to send to a client along with new data for an electronic document. The generated instructions modify the electronic document at the client to accommodate the new data. The generated instructions may include at least one tag indicating a relative order in which the new data is to be imported into the electronic document and the instructions are to be performed.

30 Claims, 8 Drawing Sheets

(56) References Cited

U.S. PATENT DOCUMENTS

| | | | |
|---|---|---|---|
| 6,681,371 B1* | 1/2004 | Devanbu | 715/209 |
| 6,701,343 B1 | 3/2004 | Kenyon | |
| 6,714,963 B1* | 3/2004 | Levine et al. | 709/203 |
| 6,829,746 B1 | 12/2004 | Schwerdtfeger et al. | |
| 6,839,707 B2* | 1/2005 | Lee et al. | 707/999.007 |
| 6,868,525 B1 | 3/2005 | Szabo | |
| 7,870,106 B1* | 1/2011 | Nguyen et al. | 707/694 |
| 8,131,815 B1* | 3/2012 | Perelman et al. | 709/217 |
| 2002/0198933 A1 | 12/2002 | Kwak | |
| 2003/0225853 A1 | 12/2003 | Wang et al. | |
| 2005/0055438 A1* | 3/2005 | Matti | 709/224 |

OTHER PUBLICATIONS

Adobe PhotoDeluxe Home Edition 3.0 Getting Started Guide, 1998, Adobe Systems Incorporated.

Apple Guide Complete: Designing and Developing Onscreen Assistance, Addison-Wesley Publishing Company 1995.

http//graphicssoft.about.com/cs/photoshopationtip/, Photoshop Action Tips—using managing debugging and troubleshooting Photoshop actions.

Houghton Mifflin Company, "The American Heritage College Dictionary", Houghton Mifflin Company, 4th, p. 519.

Mikhalenko, "Introduction to Device Independence, Part I", Sep. 22, 2004.

Microsoft Computer Dictionary Fifth Edition, Copyright 2002, p. 511.

Microsoft Windows98 Second Edition Help System, 1999.

Wikipedia definition of "Cross platform", http://en.wikipedia.org/wiki/crossplatform, printed Mar. 28, 2006.

Wikipedia definition of "Device Independent", http://en.wikipedia.org/wiki/DeviceIndependent, printed Mar. 28, 2006.

Wikipedia definition of "Java programming language", http://en.wikipedia.org/wiki/Javaprogramminglanguage, printed Mar. 28, 2006.

Wikipedia definition of "XML", http://en.wikipedia.org/wiki/XML, printed Mar. 28, 2006.

* cited by examiner

```
                // COMMENTS
                %FDF-1.2
                1 0 obj
230 ─────────  <<
                  /FDF
232 ─────────   <<
234 ─────────    /F (http://dosai/dev/test/pdf/simple.pdf)
                 /JavaScript
236 ─────────    <<
                   /Before
238 ─────────   ⎧ (
                ⎨ console.show(); // I'm JavaScript
                ⎪ console.println("Modifying document!");
                ⎪ . . .
                ⎩ )
                   >>
                  >>
                 >>
                endobj
                trailer
                <<
                 /Root 1 0 R
                >>
                %%EOF
```

*Fig. 2B*

```
// COMMENTS
1 0 obj
<< /FDF
  <<
   /F (http://username/pdfs/settingsupdated.pdf)
   /JavaScript
    <<
     /After 2 0 R
    >>
  >>
>>
endobj
2 0 obj
<<
>>
stream
Collab.defaultStore = "DAVFDF";
Collab.setStoreSettings("DAVFDF", "http://crisis/Collab/");
endstream
endobj
trailer
<<
  /Root 1 0 R
>>
%%EOF
```

Registration Form *Logo*™

410 — User Information

415 — Form Specific Information

425 — ☑ Optional Information

435 — Validation Information

CLIENT-SIDE MODIFICATION OF ELECTRONIC DOCUMENTS IN A CLIENT-SERVER ENVIRONMENT

CROSS-REFERENCE TO RELATED APPLICATIONS

This application is a continuation of U.S. patent application Ser. No. 10/006,260, filed on Nov. 2, 2001, which is hereby incorporated by reference in its entirety.

BACKGROUND

The present application describes systems and techniques relating to client-side modification of electronic documents in a client-server environment, for example, transmitting document specific instructions along with data from a server to a client to modify a final format electronic document at the client to accommodate the data.

A client-server environment is a network architecture in which clients generally rely on servers for resources, such as files, databases, devices, processing power, etc. The World Wide Web and its associated Web servers and Web browsers are a typical example of a client-server environment using an existing underlying network (e.g., the Internet) for communications. The World Wide Web generally presents server resources to clients in a context of virtual pages, which are blocks of data to be presented in a visual display. Each virtual page is typically stored as a Hypertext Markup Language (HTML) document and typically contains hyperlinks A hyperlink may be any link to a server resource, including another virtual page or another file identified by a Universal Resource Identifier (URI), or a server process (e.g., a button on a Web page that causes a server to search a database, run a program, generate a new Web page, etc., is also a hyperlink).

HTML is a markup language, derived from Standard Generalized Markup Language (SGML), for electronic documents. Predefined tags are typically used in HTML documents to define the semantic value of data within the file, including tags defining how the document should look when presented as a virtual page on a client display or when printed. HTML includes tags for identifying and interpreting scripting code, such as JavaScript, which is commonly used to add animation or advertisements to an HTML page. These tags typically specify the timing of interpreting the scripting code. For example, a function performed by the scripting code may be temporally coupled with a specific action, such as opening of the HTML page, closing of the HTML page, or clicking of a button by a user.

In general, HTML documents stay true to the client-server model, that is, traditional HTML involves a server sending electronic documents containing formatting, or presentation, information. Thus, changes that need to be made to an HTML document to respond to a client request for data generally result in a new HTML document being sent from the server to the client. However, different types of HTML exist. For example, dynamically produced HTML (e.g., Active Server Pages) is a server-side implementation variation of standard HTML, in which different requests for an HTML page may result in different versions of the HTML page being sent based on processing at the server (e.g., two clients in different geographic locales may receive different HTML pages in response to two requests having the same URI). In contrast, Dynamic HTML is a new type of HTML in which a Web page may contain machine instructions (e.g., scripts) that allow a downloaded Web page to react and change at the client in response to user inputs without sending a request to the server.

Conventional HTML files may include tags for use in creating virtual forms that a user may fill out using a Web browser. HTML does not generally separate tags relating to data type semantics from tags relating to data presentation semantics. Thus traditional HTML forms mix data collection information with data presentation information in the same document.

Efforts are underway to remove the mixing of data collection information with data presentation information in traditional HTML forms. The World Wide Web Consortium (W3C) is creating "XForms", which is a specification of Web forms that uses the Extensible Markup Language (XML) to separate form data into sections that describe what the form does (data type semantics stored in XML), and sections that describe how the form should look (data presentation semantics stored in XHTML (Extensible HTML)). (See http://www-w3-org/MarkUp/Forms/) When data in the form needs to change, a Web server may send new data to the Web browser in the XML format. When presentation format of the form needs to change, the Web server may send a new XHTML document.

In general, each HTML document may be thought of as a single virtual page, regardless of whether the document is stored as traditional HTML or XHTML. An HTML document generally has no ability to specify which portions of the document will appear on which physical pages when printed. In fact, a publisher of an HTML document has no final control over how the document will appear to an end user, because presentation of an HTML document, either by display on a monitor or by printing, is determined by the Web browser, which interprets the HTML tags.

In contrast, a final format document is an electronic document describing one or more virtual pages having a predetermined final format. The predetermined final format defines a specific visual appearance for the electronic document when displayed or printed. A final format document generally provides a device-independent and resolution-independent format for publishing and/or distributing electronic documents. Thus, a final format document is conventionally a file that lies between a layout program and the typical raster image processors, which drive traditional printing apparatus.

The final format generally allows a publisher to control the look and feel of the document as seen by an end user, including the specific physical page or pages on which information appears when printed or displayed. Thus, the final format should generally support and preserve all visual formatting features (e.g., fonts, graphics, color, etc.) of any source document, regardless of the source computer platform and/or software application used to create the source document. The ability to control final appearance, or look-and-feel, of an electronic document as viewed by a reader can be a critical branding issue for businesses and other publishing organizations, and is particularly useful when available across various computer platforms.

An example of a final format is the Portable Document Format (PDF) developed by Adobe Systems, Incorporated of San Jose, Calif. Example software for creating and reading PDF documents is Adobe® Acrobat®, also of Adobe Systems, Incorporated. The Adobe® Acrobat® software is based on Adobe's PostScript® technology which describes formatted pages of a document in a device-independent fashion.

Final format documents may be used in client-server environments. For example, on the World Wide Web, PDF documents are commonly used to present various types of information to, and also to obtain information from, Web users. A final format document may store a form, which users can fill in and/or print out, or which a server can modify to include data specific to a user. For example, Forms Data Format (FDF) is a data representation format developed by Adobe Systems, Incorporated to allow importing of data into an existing PDF document. FDF files may be used to submit data to a server, or to receive data from a server. FDF Toolkit is an application program interface (API) developed by Adobe Systems, Incorporated to facilitate the writing of server applications to generate and/or parse FDF data from a form created by the Adobe® Acrobat® Forms plug-in.

SUMMARY

Client-side modification of electronic documents by server-generated instructions in a client-server environment enables dynamic modification of formatting information in an electronic document to accommodate new data received from the server. A server generates machine instructions to send to a client along with new data for an electronic document. The generated instructions modify the electronic document at the client to accommodate the new data. The generated instructions may include at least one tag indicating a relative order in which the new data is to be imported into the electronic document and the instructions are to be performed. The electronic document may be a final format document, such as a PDF document. The dynamic modification of the electronic document may preserve pre-existing formatting information in the electronic document, either explicitly or by appending the differences created by modification to the modified electronic document.

In one aspect, a machine-implemented method of modifying an electronic document includes receiving a request from a client, producing data corresponding to the client request, generating instructions for an electronic document having a predetermined final format defining an appearance of the electronic document, and transmitting the produced data and the generated instructions to the client. The generated instructions specify operations to modify the predetermined final format at the client to accommodate the produced data.

The produced data may include a file name for a locally accessible electronic document, or a location from which the client is to retrieve the electronic document. Modification of the electronic document may maintain pre-existing final format information in the electronic document. The generated instructions may be a script, such as JavaScript, may be specific to the electronic document, and may include a tag indicating a relative order in which the produced data is to be imported into the electronic document and the instructions are to be performed.

The electronic document may be a form, such as a registration form, having one or more form fields. The form fields may be responsive to user actions and may overlay pre-existing visual objects in the electronic document, including pre-existing form fields.

In another aspect, a machine-implemented method of modifying an electronic document includes obtaining an electronic document having a predetermined final format defining an appearance of the electronic document, sending a request to a server, receiving from the server data and instructions for the electronic document, and modifying the electronic document's predetermined final format in accordance with the received instructions to accommodate the received data. Obtaining the electronic document may constitute retrieving the electronic document as directed by the instructions or just receiving the electronic document.

In yet another aspect, a machine-implemented method of modifying an electronic document includes receiving a request from a client, producing data corresponding to the client request, generating instructions for an electronic document defining visual information to be displayed, and transmitting the produced data and the generated instructions to the client. The generated instructions specify operations to modify the electronic document to accommodate the produced data, and include at least one tag indicating a relative order in which the produced data is to be imported into the electronic document and the instructions are to be performed. The at least one tag may indicate that the produced data is to be imported into the electronic document either before or after the instructions are performed, or the at least one tag may indicate that at least a portion of the generated instructions are to be inserted into the electronic document.

Implementations of the systems and techniques described here may occur in hardware, software or a combination of both, and may include machine instructions for causing a machine to perform the operations described.

Moreover, one or more of the following advantages may be provided. The systems and techniques described may result in on the fly customization of existing electronic documents for personalized data presentation while maintaining visual presentation features of the existing electronic document as desired by an author. The systems and techniques described also may result in more flexible and dynamic final format documents, including a richness in the available flexibility provided by the sequence tags described here. The systems and techniques described also may result in decreased network bandwidth consumption, improved cache utilization and faster document transmission times due to less need to reformulate and retransmit entire documents in a client-server environment.

Details of one or more embodiments are set forth in the accompanying drawings and the description below. Other features and advantages may be apparent from the description and drawings, and from the claims.

DETAILED DESCRIPTION

The systems and techniques described here relate to client-side modification of electronic documents in a client-server environment.

Figure 1A:
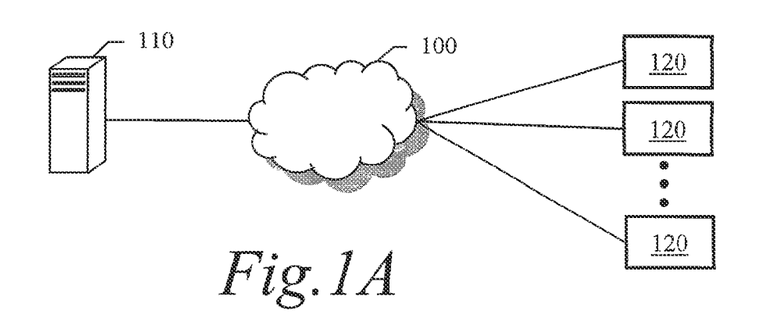
FIG. 1A is a block diagram illustrating an example client-server environment.

FIG. 1A is a block diagram illustrating an example client-server environment. A network 100 provides communication links between a server 110 and one or more clients 120. The network 100 may be any communication network linking machines capable of communicating using one or more networking protocols, including a local area network (LAN), metropolitan area network (MAN), wide area network (WAN), enterprise network, virtual private network (VPN), the Internet, etc. The server 110 may be any machine or process, capable of communicating over the network 100, that has resources available to other machines coupled with the network 100. The clients 120 may be any machines or processes capable of communicating over the network 100 with the server 110. For example, the server 110 may be a Web server, and the clients 120 may be Web browsers. The clients 120 request resources from the server 110, and the server 110 provides requested resources to the clients 120, if available.

Figure 1B:
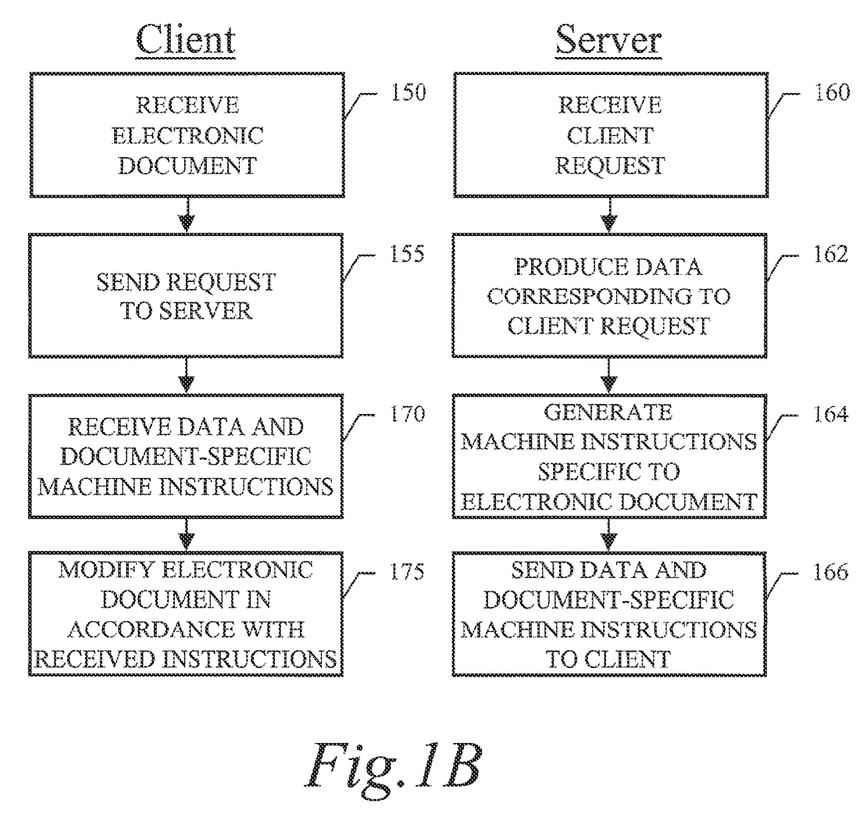
FIG. 1B is a logic flow diagram of an example client process and a corresponding server process for transmitting document-specific instructions and data to modify an electronic document at a client to accommodate the data.

FIG. 1B is a logic flow diagram of an example client process and a corresponding server process for transmitting document-specific instructions and data to modify an electronic document at a client to accommodate the data. A client receives an electronic document at 150. The electronic document may have a predetermined final format defining an appearance of the electronic document. For example, the electronic document may be a PDF document, such as an electronic form, publication, or search result received from a server, which may or may not be a server performing the corresponding server process described below.

The client sends a request to a server at 155. The request relates to the electronic document, and may be initiated by user interaction with the electronic document. For example, the electronic document may be a form stored as a PDF file, which causes a request to be sent to the server at 155 when a user enters information into a form field or selects a check-box. Alternatively, the request may be initiated by some other user activity. For example, a user may click a hyperlink in an HTML page or a PDF document that causes the request to be sent at 155.

The server receives the request at 160. The server processes the request and produces data corresponding to the request at 162. For example, the server may access a data store or search a database to collect the data corresponding to the request, or the server may generate the data using one or more scripts or software processes. In addition, the server generates instructions, which are specific to the electronic document, at 164. The generated instructions are machine instructions to modify the electronic document at the client to accommodate the produced data. These machine instructions may be scripts written in a scripting language, such as JavaScript, VBScript (Visual Basic Scripting Edition), Jscript, ECMAScript (ECMA-262 (European Computer Manufacturers' Association standard 262)), etc.

Then at 166, the server sends the produced data and the machine instructions to the client. The machine instructions may be compressed before transmission to the client to reduce transmission load. For example, the machine instructions may be compressed JavaScript added to an FDF along with the produced data, and the FDF is then transmitted as a stream of information to the client at 166. Alternatively, the server may send the produced data and a reference to the machine instructions to the client at 166, and the client then retrieves the referenced machine instructions.

The client receives the data and the document-specific machine instructions at 170. Then at 175, the machine instructions are performed at the client to modify the electronic document. Although the machine instructions are specific to the electronic document, they need not be specific to only a single electronic document, or specifically identify the electronic document. For example, the electronic document may be a PDF file currently opened in a Web browser, in which case the machine instructions are performed against the currently opened document unless another document is identified by the generated instructions and/or the produced data.

The generated instructions are tied to the produced data and to the electronic document in that they are customized to modify the formatting of the electronic document to accept the produced data. By sending the machine instructions with the produced data to the client, the visual presentation formatting of the electronic document may be dynamically changed in a client-server environment to accommodate data produced by a server in response to user activity, without the need to send a new electronic document having visual presentation formatting definitions.

Moreover, additional benefits may be obtained in the context of final format electronic documents by not re-flowing the electronic document in light of the modification. For example, if the electronic document is a form stored in PDF, the instructions may add a new field to the existing form by appending attribute definitions to the PDF file that describe how to construct the field (e.g., type of field, location, dimensions, color, border, etc.), even if the resulting field would overlay some existing content in the visual presentation of the PDF file. By not re-flowing the electronic document, and thus not changing pre-existing final format information in the electronic document, the predefined final format is preserved/respected. The modified electronic document may include many layers of visual presentation information and effectively retains a history of the changes made, which can easily be unmade if desired.

Alternatively, a history of changes may be maintained by appending differences between a modified final format document and the unmodified final format document as discussed further below.

In addition, the generated instructions may include a tag that indicates a relative order in which the produced data is to be imported into the electronic document and the machine instructions are to be performed. For example, three tags may be defined: (1) 'Before', (2) 'After', and (3) 'Document'. The 'Before' tag indicates that the machine instructions are to be performed against the electronic document before the produced data is imported into the electronic document. The 'After' tag indicates that the machine instructions are to be performed against the electronic document after the produced data is imported into the electronic document. Finally, the 'Document' tag indicates that the machine instructions are to be inserted into the electronic document, to become document-level machine instructions (potentially replacing any subroutines having the same name). These document-level machine instructions would generally be executed against the electronic document each time the electronic document is opened, but may also be invoked as subroutines by future machine instructions executing in the document.

The logic flow depicted in FIG. 1B does not require the particular order shown. For example, receiving the electronic document at 150 may occur after receiving the data and instructions at 170. The data and instructions received at 170 may specify the electronic document to be modified using a URI, in which case, the client receives the electronic document to be modified at 175 only after requesting the electronic document from an appropriate server following 170. Moreover, in certain implementations, multi-tasking and parallel processing are performed.

Figure 2A:
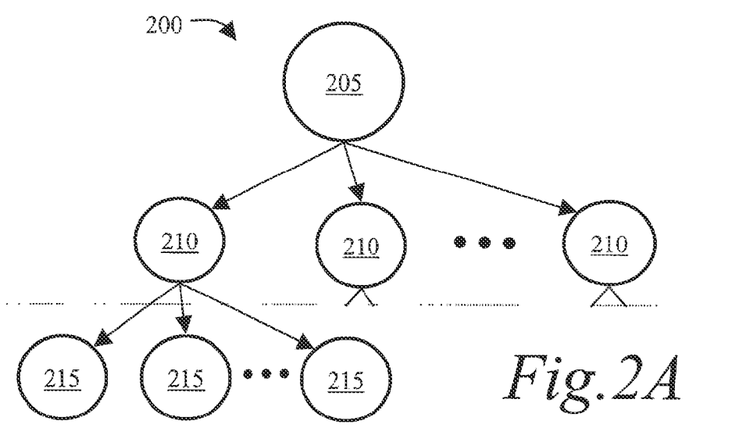
FIG. 2A is a diagram illustrating an example data model for use in transmitting data and machine instructions to modify a final format document.

FIG. 2A is a diagram illustrating an example data model for use in transmitting data and machine instructions to modify a final format document. The data model may be generally regarded as a tree 200. The tree 200 is typically stored as data and machine instructions with associated tags defining the semantic value of the data and machine instructions. The tree 200 may be written to a file, and the data and machine instructions may be stored as ASCII (American Standard Code for Information Interchange) characters.

The tree 200 includes a root node 205, which may be explicit or implicit. For example, the root node 205 may be explicit, such as when a specific tag identifies the root node 205. Alternatively, the root node 205 may be implicit, such as when it is represented by a declaration at the beginning of a data stream or a data file, or such as when a data file has an extension on the file's name to identify the type of data contained therein.

The root node 205 may have one or more child nodes 210, which in turn may have one or more child nodes 215, and so on. These nodes 210,215 are elements, which may be data elements or machine instruction elements, and which may have various associated attributes. The tags that delineate these elements may be implemented using many different syntax standards. For example, they may be implemented using XML. Alternatively, they may be implemented using Key/Value pairs to identify elements, along with grouping symbols to group multiple sub-elements within a Value field. For example, a tree 200 may be stored in the PDF syntax. The full specification for the PDF syntax can be found at the following URL: http://partners-adobe-com/asn/developer/acrosdk/docs/PDFRef.pdf.

Figure 2B:
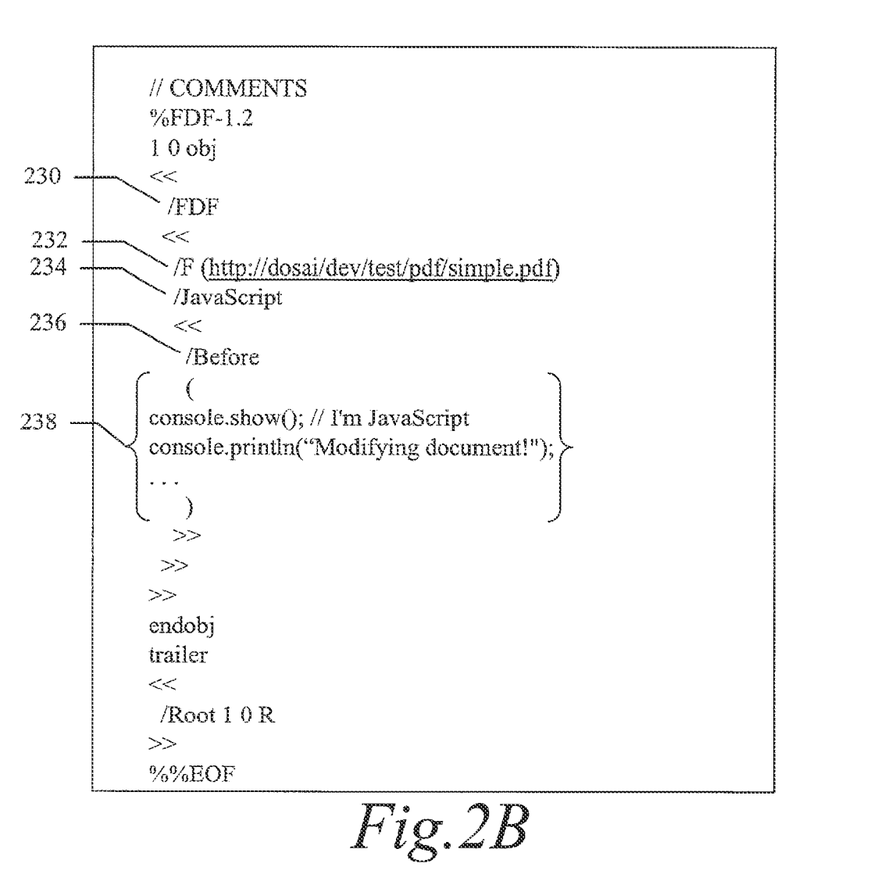
FIG. 2B is an example printout of an example data tree stored as an FDF.

FIG. 2B is an example printout of an example data tree stored as an FDF. The printout of FIG. 2B shows a dictionary object containing Key/Value pairs and grouping symbols '<<' and '>>'. The first Key in an indirect object '1 0' is the '/FDF' Key 230. Its Value is a dictionary object grouped by the '<<' and '>>' symbols. This dictionary object contains a 'IF' Key 232, which is an optional key that identifies the PDF file for which the FDF has been specifically tailored. If the '/F' Key 232 is not present, the FDF may be specific to a currently opened PDF (e.g., if a user is looking at a PDF document in a Web browser, and the user performs an action that triggers generation and transmission of the FDF to the Web browser, such as by triggering a Common Gateway Interface (CGI) script on a server, then the FDF implicitly refers to the opened PDF). Alternatively, absence of the '/F' Key 232 may cause a window to be opened allowing a user to browse for the PDF when the FDF is processed.

A '/JavaScript' Key 234 identifies the Value to follow as machine instructions, which will include instructions in the JavaScript language. The first machine instruction is a '/Before' Key 236, which is a tag that instructs a machine to perform the JavaScript instructions in the string Value 238 before processing the FDF with respect the PDF document. This first machine instruction could also be a '/After' Key or a '/Doc' Key.

Figure 2C:
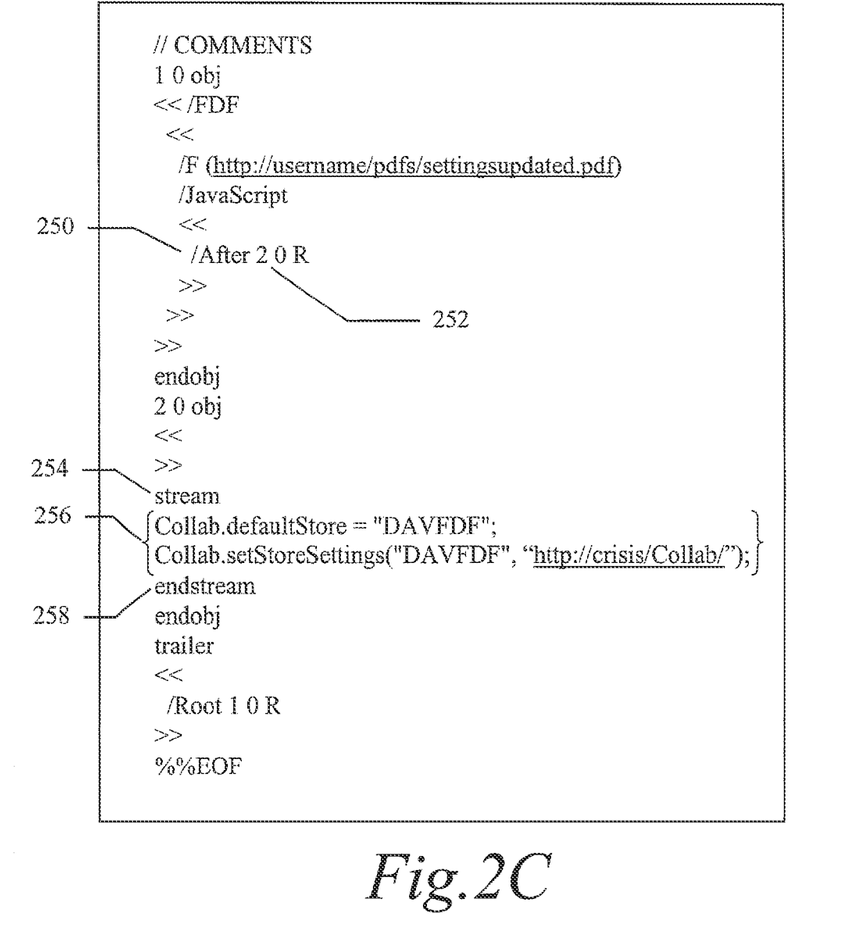
FIG. 2C is an example printout of another example data tree stored as an FDF.

FIG. 2C is an example printout of another example data tree stored as an FDF. In this example, a '/After' Key 250 is used, and its Value is a reference 252 to an indirect object '2 0', instead of a string. The indirect object '2 0' identifies an outside source 256, using beginning and ending tags 254, 258, from which to obtain streaming JavaScript. As mention above, the JavaScript may also be compressed.

A data tree as described above may also be used to store the differences between a modified final format document and the unmodified final format document, by appending the differences created by modification to the modified final format document in the data tree syntax.

Figure 3A:
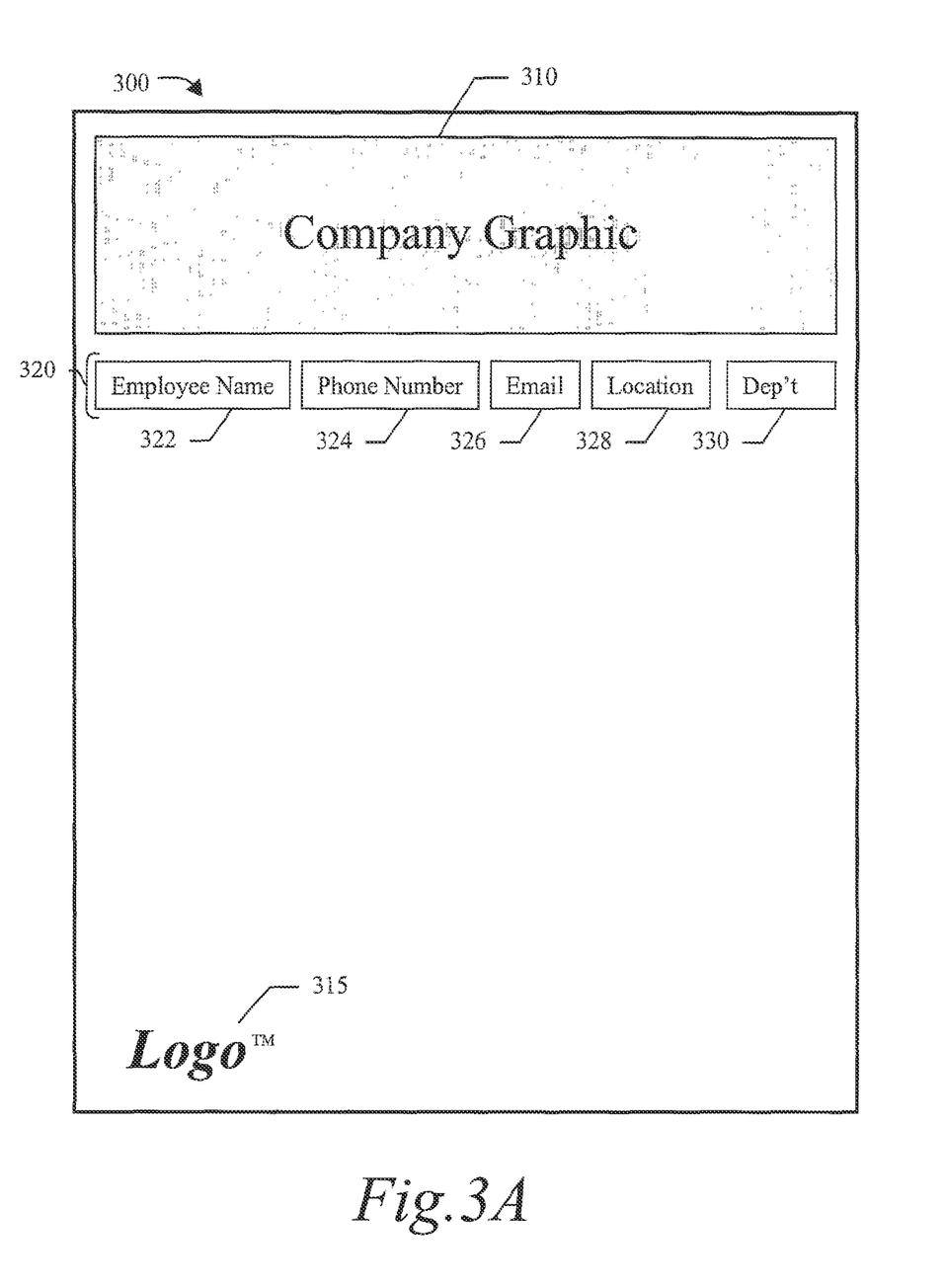
FIGS. 3A and 3B are illustrations of an example final format document, before and after modification by document-specific machine instructions.
Figure 3B:
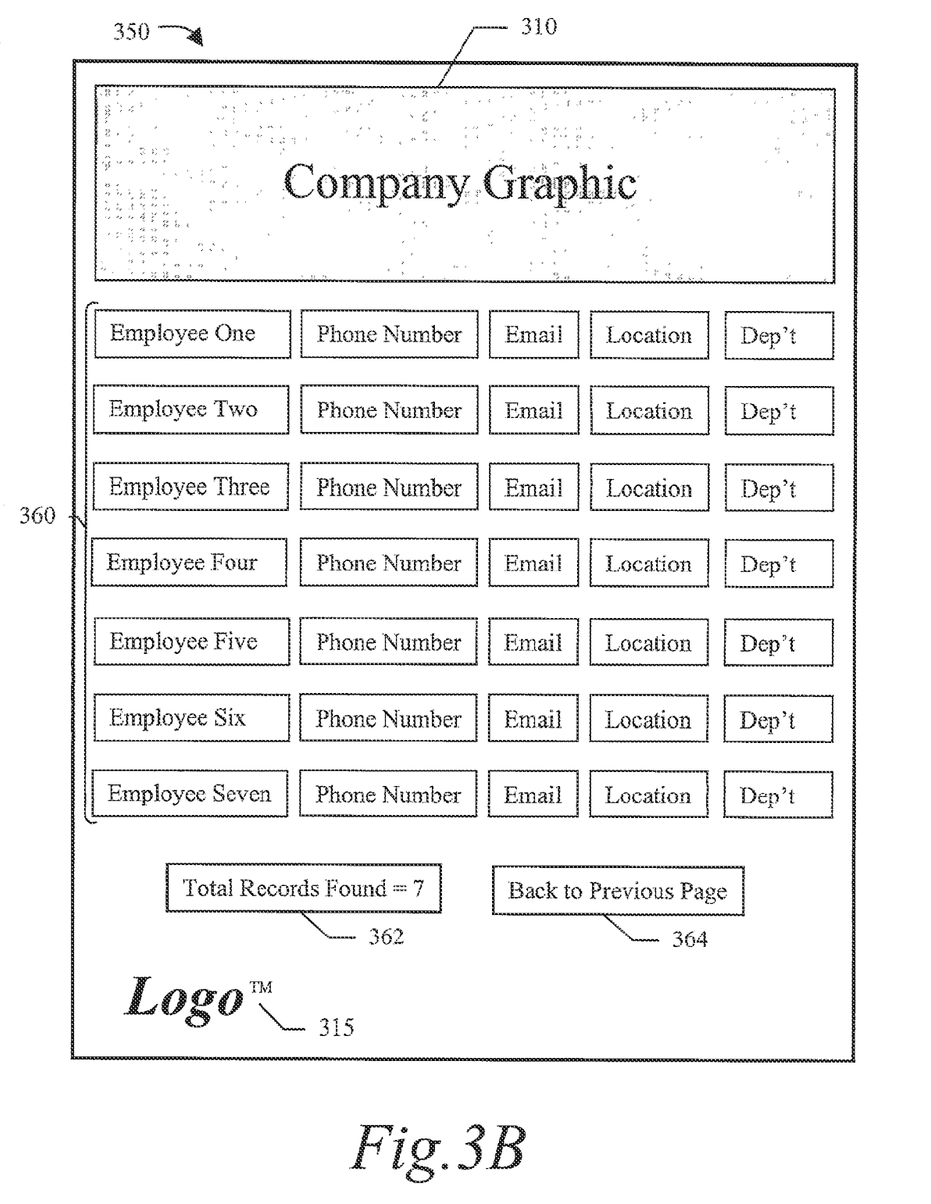

FIGS. 3A and 3B are illustrations of an example final format document, before and after modification by document-specific machine instructions. A company information document 300 is a final format document that may be printed or viewed exactly as shown, including viewing the company information document 300 with a Web browser. The company information document 300 includes a company graphic 310 and a company logo 315. The graphic 310 and the logo 315 are designed to be consistent with the company's overall branding strategy.

The company information document 300 may include information such as employee contact information 320. The employee contact information 320 may include an employee name field 322, a phone number field 324, an email field 326, an address/location field 328, and a company department field 330. These fields may have various functionality associated with them. For example, the company information document 300 may be a PDF document in which, when the document is viewed with a Web browser, clicking on the employee name field 322 causes the Web browser to retrieve a Web page biography of the employee from the company's Web site, clicking on the email field 326 causes a new email message window to be opened with the particular employee's email address already included, and clicking on the company department field 330 causes the Web browser to retrieve another PDF document with details about the company department.

Referring now to FIG. 3B, a company information document 350 is a final format document derived from the company information document 300 using the systems and techniques described here. For example, a user may be browsing a company's Web site and perform a search for company employees that satisfy user specified criteria. In response to the user's search request, the company's Web server performs a database search, packages the search result data, a reference to the company information document 300 and machine instructions for modifying the company information document 300 into a single communication, which is sent to the user's Web browser. The Web browser receives the communication, retrieves the company information document 300, and performs the machine instructions to modify the company information document 300 to create the company information document 350 for display to the user.

The company information document 350 retains the same company graphic 310 and company logo 315 as the original company information document 300. But the company information document 350 also contains the search result data in appropriately formatted fields 360,362. If the search result data had been more extensive, the machine instructions sent by the Web server would have modified the company information document 300 to be a multiple page company information document 350. Because the company information document 350 is a final format document, it is ready to be printed and will appear on the printed page as the company intends.

Moreover, the machine instructions may add functional fields that are context sensitive. Thus, in the example described above, the company Web server also sent machine instructions to add a link field 364, which allows the user to go back to the previous page (i.e., the search request page in this example) by clicking the link field 364. This link may be to many different types of previous pages, including an HTML Web page, an XHTML Web page, a final format document, etc.

If the user clicks the link field 364, and then submits a new search request, the company's Web server may now send a single communication that contains the new search result data and machine instructions for modifying the company information document 350. Because the user already has a copy of the company information document 350, the company graphic 310 and the company logo 315 do not need to be retransmitted to the Web browser, thus reducing transmission times and network congestion.

Moreover, the same company information document 350 may be modified to become many different types of company information documents. For example, the user may click on one of the company department fields in the company information document 350, and the Web server may then send data and machine instructions to modify the company information document 350 to include details about the selected company department, potentially removing or overlaying the fields 360,362,364.

An example FDF for modifying a PDF file in a manner similar to that shown in FIGS. 3A and 3B is shown here in Table 1. The example FDF shown in Table 1 is uncompressed, whereas typically the FDF would be compressed to save on memory usage and transmission times.

TABLE 1

```
%FDF-1.2
1 0 obj
<<
/FDF <<
/Fields 2 0 R
/JavaScript <<
/Doc [
(DrawOneRow)9 0 R
(DrawResultField)11 0 R
(DrawBackButton)13 0 R
(SetCaption)10 0 R
]
/Before 12 0 R
>>
/F (SearchResult.pdf)>>
>>
endobj
2 0 obj
[
<< /T (name1)/Kids 3 0 R >> << /T (phone)/Kids 4 0 R >> << /T (email)/Kids 5 0 R >>
<< /T (location)/Kids 6 0 R >> << /T (office_num)/Kids 7 0 R >>
<< /T (job_title)/Kids 8 0 R >> << /T (result)/V (Total records found = 2)>>
<< /T (back)/A << /S /GoToR /D (MainPage)/F (PhnDirSrch.pdf)>> >>
]
endobj
3 0 obj
[
<< /T (0)/V (Roberto Perelman)>> << /T (1)/V (Vadim Perelman)>>
]
endobj
4 0 obj
[
<< /T (0)/V (408-536-4421)>> << /T (1)/V (408-536-4453)>>
]
endobj
5 0 obj
[
<< /T (0)/A << /S /JavaScript /JS (app.mailMsg\(true, "rperelma@adobe.com"\))>>>>
<< /T (1)/A << /S /JavaScript /JS (app.mailMsg\(true, "vperelma@adobe.com"\))>>>>
]
```

TABLE 1-continued

```
endobj
6 0 obj
[
<< /T (0)/V (WestTower.15)>> << /T (1)/V (WestTower.15)>>
]
endobj
7 0 obj
[
<< /T (0)/V (W15-430)>> << /T (1)/V (W15-Kabel)>>
]
endobj
8 0 obj
[
<< /T (0)/V (Document Technologies)>> << /T (1)/V (Acrobat Engineering)>>
]
endobj
9 0 obj
<<
>>
stream
var i=0.2;
var p=0;
function DrawOneRow( )
{
    var inch=72;
    if( j%10 == 0 && j )
    {
        this.spawnPageFromTemplate("blank");
        p++;
        i=0.5;
    }
    var aRect = this.getPageBox( {nPage: p} );
    aRect[0] += 0.3*inch;
    aRect[2] = aRect[0]+2*inch;
    aRect[1] -= i * inch;
    aRect[3] = aRect[1] - 40;
    var f = this.addField("name1."+ j, "text", p, aRect );
    f.delay = true;
    f.borderStyle = border.s;
    f.borderColor = color.magenta;   f.textSize = 16;
    f.textColor = color.blue;
    f.fillColor = color.yellow;
    f.readonly = true;
    f.delay = false;
    var aRect = this.getPageBox( {nPage: p} );
    aRect[0] += 2.4*inch;
    aRect[2] = aRect[0]+1.6*inch;
    aRect[1] -= i * inch;
    aRect[3] = aRect[1] - 40;
    var f = this.addField("phone."+ j, "text", p, aRect );
    f.delay = true;
    f.borderStyle = border.s;
    f.borderColor = color.magenta;   f.textSize = 0;
    f.textColor = color.blue;
    f.fillColor = color.yellow;
    f.readonly = true;
    f.delay = false;
    var aRect = this.getPageBox( {nPage: p} );
    aRect[0] += 4.1*inch;
    aRect[2] = aRect[0]+1.2*inch;
    aRect[1] -= i * inch;
    aRect[3] = aRect[1] - 40;
    var f = this.addField("email." + j, "button", p, aRect );
    f.delay = true;
    f.borderColor = color.magenta;   f.borderStyle = border.i;
    f.textColor = color.blue;
    f.fillColor = color.yellow;
    f.textSize = 16;
    f.delay = false;
    var aRect = this.getPageBox( {nPage: p} );
    aRect[0] += 5.4*inch;
    aRect[2] = aRect[0]+1.7*inch;
    aRect[1] -= i * inch;
    aRect[3] = aRect[1] - 40;
    var f = this.addField("location."+ j, "text", p, aRect );
    f.delay = true;
    f.borderStyle = border.s;
    f.borderColor = color.magenta;   f.textSize = 13;
    f.textColor = color.blue;
```

TABLE 1-continued

```
            f.fillColor = color.yellow;
            f.readonly = true;
            f.delay = false;
            var aRect = this.getPageBox( {nPage: p} );
            aRect[0] += 7.2*inch;
            aRect[2] = aRect[0]+1*inch;
            aRect[1] -= i * inch;
            aRect[3] = aRect[1] - 40;
            var f = this.addField("office_num." + j, "text", p, aRect );
            f.delay = true;
            f.borderStyle = border.s;
            f.borderColor = color.magenta;    f.textSize = 14;
            f.textColor = color.blue;
            f.fillColor = color.yellow;
            f.readonly = true;
            f.delay = false;
            var aRect = this.getPageBox( {nPage: p} );
            aRect[0] += 8.3*inch;
            aRect[2] = aRect[0]+2.5*inch;
            aRect[1] -= i * inch;
            aRect[3] = aRect[1] - 40;
            var f = this.addField("job_title." + j, "text", p, aRect );
            f.delay = true;
            f.borderStyle = border.s;
            f.borderColor = color.magenta;    ftextSize = 0;
            f.textColor = color.blue;
            f.fillColor = color.yellow;
            f.readonly = true;
            f.multiline = true;
            f.delay = false;
            i+=0.8;
}
endstream
endobj
10 0 obj
<<
>>
stream
function SetCaption( string )
{
            aList = string.split(",");
            for( var i=0 ; i < aList.length-1; i++) {
                    var f = this.getField("email."+i);
                    f.buttonSetCaption(aList[i]);
            }
}
endstream
endobj
11 0 obj
<<
>>
stream
function DrawResultField( )
{
            var inch=72;
            if( j%10 == 0 && j )
            {
                this.spawnPageFromTemplate("blank");
                p++;
                i=0.5;
            };
            var aRect = this.getPageBox( {nPage: p} );
            aRect[0] += 1*inch;
            aRect[2] = aRect[0]+4*inch;
            aRect[1] -= (i+0.1) * inch;
            aRect[3] = aRect[1] - 35;
            var f = this.addField("result", "text", p, aRect);
            f.delay = true;
            f.borderStyle = border.b;
            f.fillColor = color.green;
            f.textColor = color. gray;
            f.borderColor = color.red;
            f.readonly = true;
            f.delay = false;
}
endstream
endobj
12 0 obj
<<
>>
```

TABLE 1-continued

```
stream
for (j=0; j<2; j++)
            DrawOneRow( );
SetCaption(" rperelma,vperelma, ");
DrawResultField( );
DrawBackButton( );
endstream
endobj
13 0 obj
<<
>>
stream
function DrawBackButton( )
{
            var inch=72;
            var aRect = this.getPageBox( {nPage: p} );
            aRect[0] += 5.5*inch;
            aRect[2] = aRect[0]+4*inch;
            aRect[1] -= (i+0.1) * inch;
            aRect[3] = aRect[1] - 35;
            var f = this.addField("back", "button", p, aRect );
            f.delay = true;
            f.borderStyle = border.b;
            f.fillColor = color.green;
            f.textColor = color.gray;
            f.borderColor = color.red;
            f.delay = false;
            f.buttonSetCaption("BACK TO INITIAL PAGE")
}
endstream
endobj
trailer
<<
/Root 1 0 R
>>
%%EOF
```

Figure 4A:
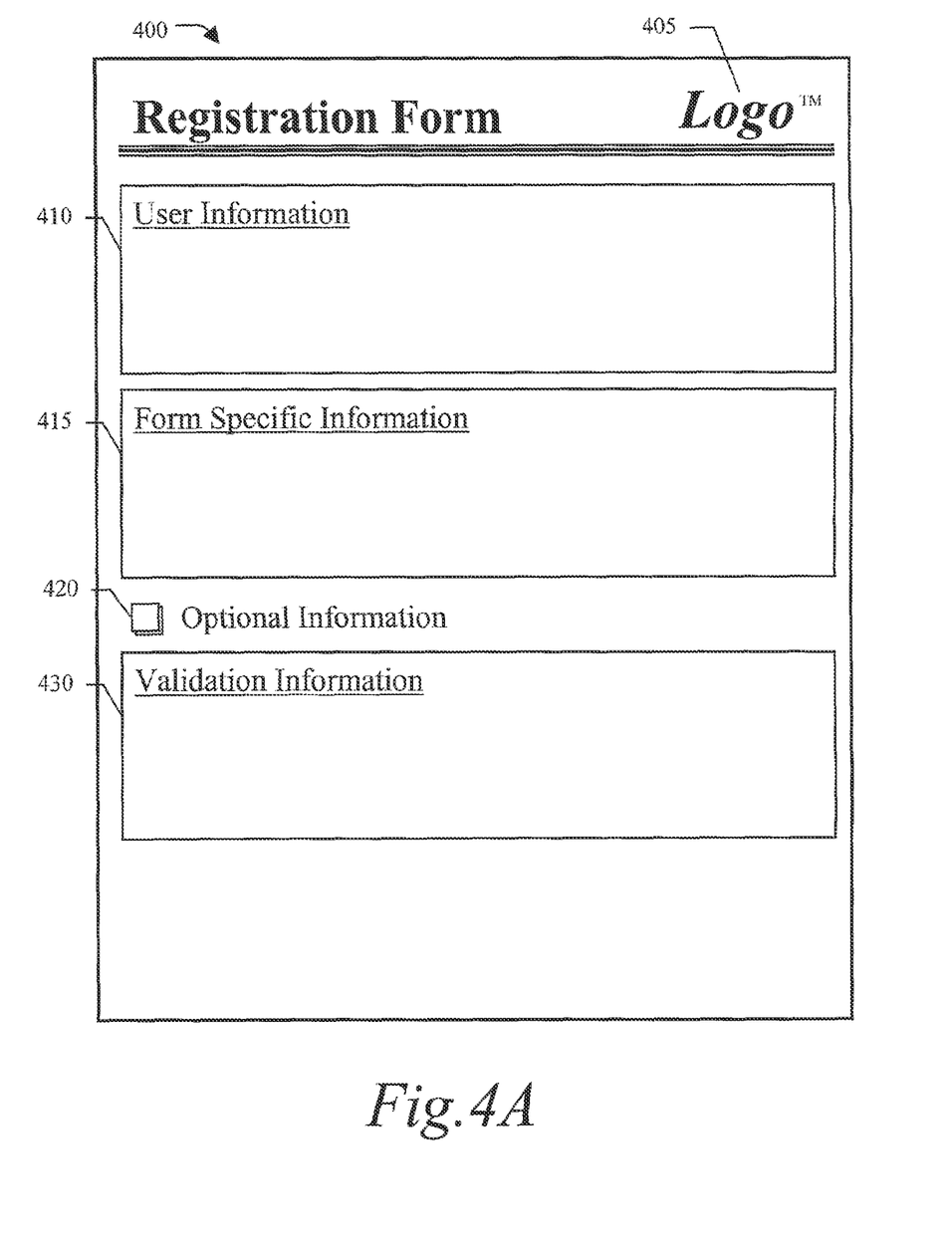
FIGS. 4A and 4B are illustrations of an example final format form document, before and after modification by document-specific machine instructions.
Figure 4B:
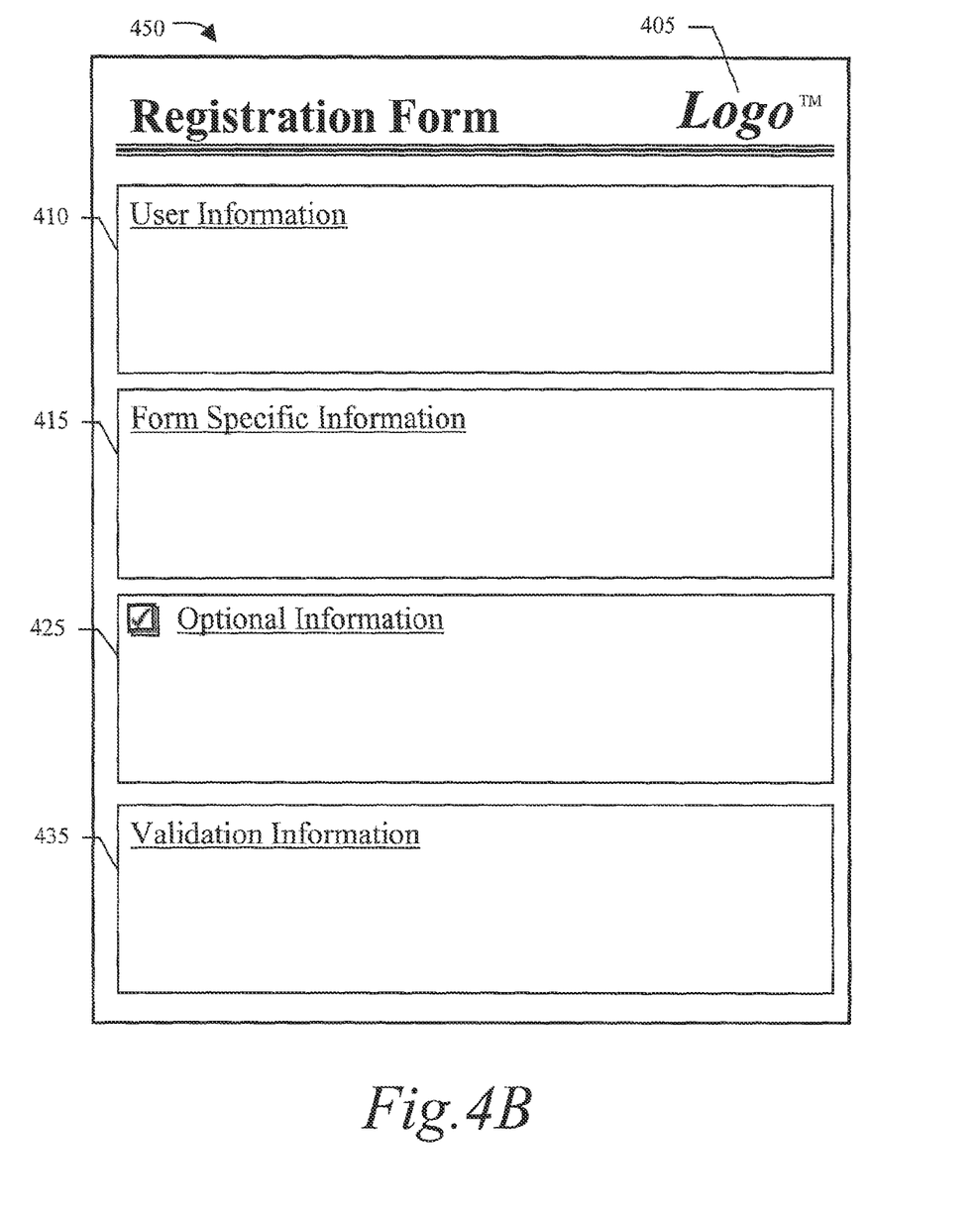

FIGS. 4A and 4B are illustrations of an example final format form document, before and after modification by document-specific machine instructions. A registration form document 400 is a final format document that may be printed or viewed exactly as shown, including viewing the registration form document 400 with a Web browser. The registration form document 400 may be any type of registration form (e.g., product registration, event registration, voter registration, etc.), and may include a logo 405.

The registration form 400 includes a user information section 410 for collecting user information (e.g., name, address, gender, age, etc.), a form specific information section 415 for collecting information corresponding to the particular type of registration form (e.g., location of purchase, meal selection, political party selection, etc.), and a validation information section 430 for collecting validation information (e.g., product serial number, membership number, digital signature, hand written signature, etc.). Each of these form sections 410,415,430 may include various types of form fields, such as text entry fields, check-box fields, alternative check-box fields, etc. These form fields may be static (i.e., the user must print the form out to use it; or a server must initiate insertion of data into the fields, such as by using the systems and techniques described here) or dynamic (i.e., the user may enter data directly into the electronic final format form document).

The registration form 400 also includes an optional check-box 420 to allow a user to submit optional information. If the user clicks the optional check-box 420, a request is sent to a server for the optional information fields. In response, the server sends data and machine instructions to convert the registration form 400 into a registration form 450. The registration form 450 retains the logo 405, the user information section 410, and the form specific information section 415. In addition, the registration form 450 includes an optional information section 425 for collecting optional information (e.g., a consumer survey), and a new validation information section 435, which retains any information previously entered in the validation information section 430, but is now in a new location on the page.

Although the example above is of a registration form, many different types of form documents are possible. Moreover, each such form may have its underlying final format, and the corresponding visual appearance, customized by machine instructions received from a server to accommodate data sent by the server along with the machine instructions. This includes removal of form fields and/or addition of form fields.

Moreover, many other types of final form document may utilize the systems and techniques described here. A company may send an abbreviated catalogue of their products to a consumer, and then dynamically expand the product coverage in the catalogue as the consumer makes new requests for information. An electronic publication may incorporate dynamic customized annotation stores (e.g., using a Web repository or SQL (Structured Query Language) database) and/or dynamic preference settings. For example, a server may cause machine instructions to be inserted into a final format document, where the machine instructions set up a user's online commenting preferences for that final format document. Each time the final format document is then opened, the user's online commenting preferences are automatically set up for that viewing.

Figure 5:
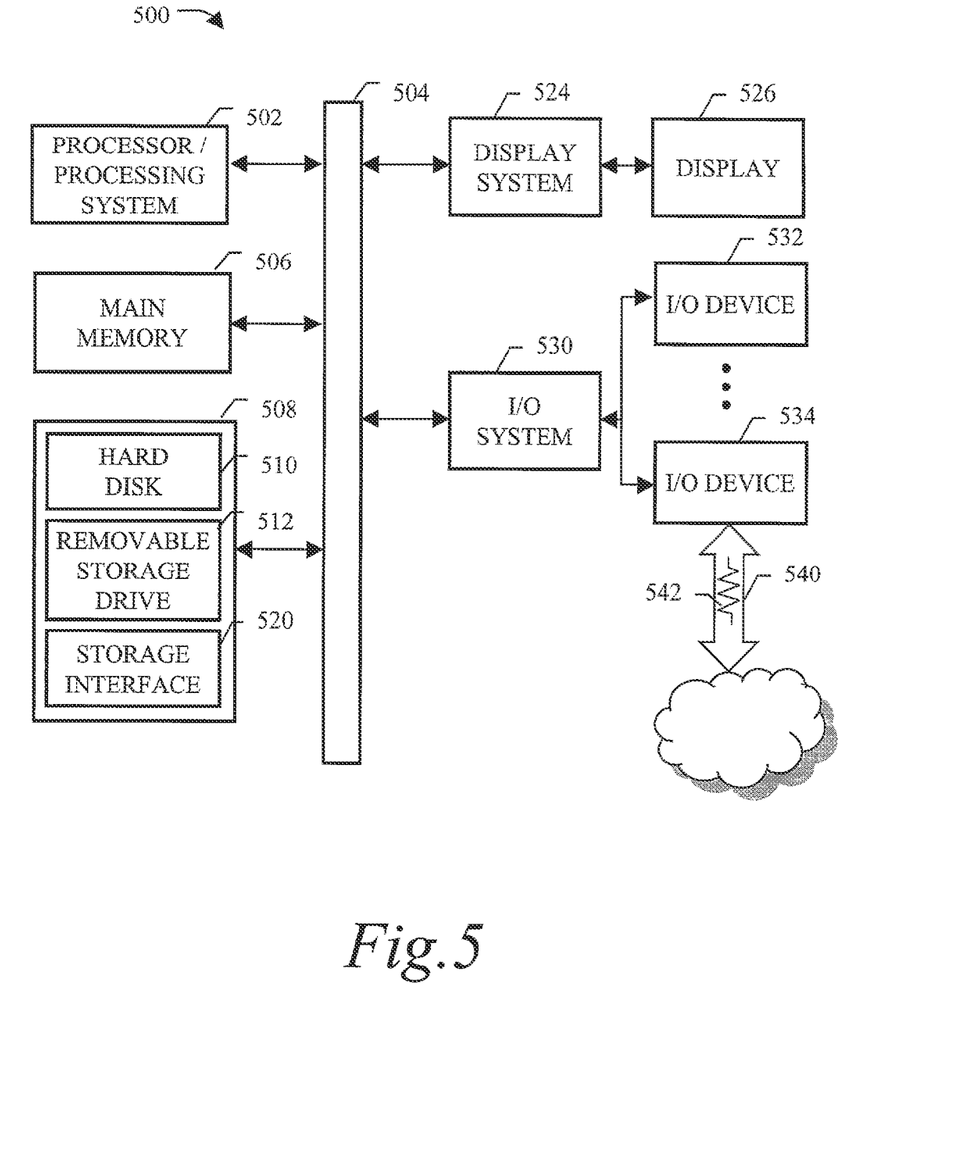
FIG. 5 is a block diagram illustrating an example computing environment.

FIG. 5 is a block diagram illustrating an example computing environment. An example machine 500 includes a processing system 502, which may include a central processing unit such as a microprocessor or microcontroller for executing programs to control tasks in the machine 500, thereby enabling the features and function described above. Moreover, the processing system 502 may include one or more additional processors, which may be discrete processors or may be built in to the central processing unit.

The processing system 502 is coupled with a bus 504, which provides a set of signals for communicating with the processing system 502 and may include a data channel for facilitating information transfer between storage and other peripheral components of the machine 500.

The machine 500 may include embedded controllers, such as Generic or Programmable Logic Devices or Arrays (PLD, PLA, GAL, PAL), Field Programmable Gate Arrays (FPGA), Application Specific Integrated Circuits (ASIC), single-chip computers, smart cards, or the like, which may serve as the processing system 502.

The machine 500 may include a main memory 506 and one or more cache memories, and may also include a secondary memory 508. These memories provide storage of instructions and data for programs executing on the processing system 502, and may be semiconductor based and/or non-semiconductor based memory. The secondary memory 508 may include, for example, a hard disk drive 510, a removable storage drive 512 and/or a storage interface 520.

The machine 500 may also include a display system 524 for connecting to a display device 526. The machine 500 includes an input/output (I/O) system 530 (i.e., one or more controllers or adapters for providing interface functions) for connecting to one or more I/O devices 532-534. The I/O system 530 may provide a communications interface, which allows software and data to be transferred, in the form of signals 542, between machine 500 and external devices, networks or information sources. The signals 542 may be any signals (e.g., electronic, electromagnetic, optical, etc.) capable of being received via a channel 540 (e.g., wire, cable, optical fiber, phone line, infrared (IR) channel, radio frequency (RF) channel, etc.). A communications interface used to receive these signals 542 may be a network interface card designed for a particular type of network, protocol and channel medium, or may be designed to serve multiple networks, protocols and/or channel media.

Machine instructions (also known as programs, software or code) may be stored in the machine 500 or delivered to the machine 500 over a communications interface. As used herein, the term "machine-readable medium" refers to any media used to provide information indicative of one or more operational instructions for the machine 500. Such information includes machine instructions provided to the processing system 502 for execution, and such media include embedded controllers, memory devices, and signals on a channel.

Other systems, architectures, and modifications and/or reconfigurations of machine 500 of FIG. 5 are also possible. The various implementations described above have been presented by way of example only, and not limitation. Other embodiments may be within the scope of the following claims.

What is claimed is:

1. A method comprising:
receiving, at a computer system, a request from a client to obtain data that is to be imported into an electronic document at the client, the electronic document having a predetermined format that defines an appearance of the electronic document that is independent of a device used to present the electronic document;
producing, at the computer system, data corresponding to the client request;
generating, by the computer system, instructions to modify the electronic document, wherein the generated instructions (a) specify one or more operations to modify the electronic document's predetermined format at the client so as to accommodate importation of the produced data into the electronic document, (b) are performed at the client to effect the one or more operations, and (c) include a tag that indicates a temporal order in which (i) the produced data is to be imported into the electronic document and (ii) the operations to modify the electronic document's predetermined format are to be performed; and
transmitting the produced data and the generated instructions to the client,
wherein the tag is a before tag or an after tag,
wherein the before tag indicates that the produced data is to be imported into the electronic document before the operations to modify the electronic document's predetermined format are performed, and
wherein the after tag indicates that the produced data is to be imported into the electronic document after the operations to modify the electronic document's predetermined format are performed.

2. The method of claim 1, wherein the operations to modify the predetermined format at the client result in a new visual object to overlay one or more pre-existing visual objects in the electronic document.

3. The method of claim 1, wherein the generated instructions are specific to the electronic document, and the operations to modify the predetermined format at the client result in one or more of the following document changes: field identity change, field location re-arrangement, or field content change.

4. The method of claim 1, wherein the client request comprises a database search request, and wherein producing data comprises retrieving data from a database.

5. A non-transitory machine-readable storage medium embodying information indicative of commands for causing one or more computer systems to perform functionality comprising:

receiving, at the one or more computer systems, a request from a client to obtain data that is to be imported into an electronic document at the client, the electronic document having a predetermined format that defines an appearance of the electronic document that is independent of a device used to present the electronic document;

producing, at the one or more computer systems, data corresponding to the client request;

generating, by the one or more computer systems, instructions to modify the electronic document, wherein the generated instructions (a) specify one or more operations to modify the electronic document's predetermined format at the client so as to accommodate importation of the produced data into the electronic document, (b) are performed at the client to effect the one or more operations, and (c) include a tag that indicates a temporal order in which (i) the produced data is to be imported into the electronic document and (ii) the operations to modify the electronic document's predetermined format are to be performed; and transmitting the produced data and the generated instructions to the client;

wherein the tag is a before tag or an after tag, wherein the before tag indicates that the produced data is to be imported into the electronic document before the operations to modify the electronic document's predetermined format are performed, and wherein the after tag indicates that the produced data is to be imported into the electronic document after the operations to modify the electronic document's predetermined format are performed.

6. The non-transitory machine-readable storage medium of claim 5, wherein the operations to modify the predetermined format at the client result in a new visual object to overlay one or more pre-existing visual objects in the electronic document.

7. The non-transitory machine-readable storage medium of claim 5, wherein the generated instructions are specific to the electronic document, and the operations to modify the predetermined format at the client result in one or more of the following document changes: field identity change, field location re-arrangement, or field content change.

8. The non-transitory machine-readable storage medium of claim 5, wherein the client request comprises a database search request, and wherein producing data comprises retrieving data from a database.

9. A system comprising:

a client configured to receive an electronic document, the electronic document having a predetermined format that defines an appearance of the electronic document independent of a device used to present the electronic document; and a server in communication with the client, the server configured to perform functionality including:

receiving a request from the client to obtain data that is to be imported into the electronic document at the client, producing data corresponding to the client request, generating instructions to modify the electronic document, wherein the generated instructions (a) specify one or more operations to modify the electronic document's predetermined format at the client so as to accommodate importation of the produced data into the electronic document, and (b) include a tag that indicates a temporal order in which (i) the produced data is to be imported into the electronic document and (ii) the operations to modify the electronic document's predetermined format are to be performed, and transmitting the produced data and the generated instructions to the client, wherein the client is configured to perform the generated instructions to effect the one or more operations, wherein the tag is a before tag or an after tag, wherein the before tag indicates that the produced data is to be imported into the electronic document before the operations to modify the electronic document's predetermined format are performed, and wherein the after tag indicates that the produced data is to be imported into the electronic document after the operations to modify the electronic document's predetermined format are performed.

10. The system of claim 9, wherein the operations to modify the predetermined format at the client result in a new visual object to overlay one or more pre-existing visual objects in the electronic document.

11. The system of claim 9, wherein the generated instructions are specific to the electronic document, and the operations to modify the predetermined format at the client result in one or more of the following document changes: field identity change, field location re-arrangement, or field content change.

12. The system of claim 9, wherein the client request comprises a database search request, and wherein producing data comprises retrieving data from a database.

13. A method comprising:

receiving, at a computer system, a request from a client to obtain data that is to be imported into an electronic document at the client that is defined by a page description language, the page description language defining a visual appearance for a physical page of the electronic document;

producing, at the computer system, data corresponding to the request;

generating, by the computer system, instructions to modify the electronic document, the instructions specifying one or more operations to modify a page description of the electronic document so as to accommodate importation of the produced data into the electronic document, wherein the instructions include a tag that indicates a temporal order in which (i) the produced data is to be imported into the electronic document and (ii) the operations to modify the page description are to be performed; and transmitting the produced data and the generated instructions to the client, the generated instructions to be performed at the client to modify the page description of the electronic document to accommodate importation of the produced data, wherein the tag is a before tag or an after tag, wherein the before tag indicates that the produced data is to be imported into the electronic document before the operations to modify the page description are performed, and wherein the after tag indicates that the produced data is to be imported into the electronic document after the operations to modify the page description are performed.

14. The method of claim 13, wherein the one or more operations includes an operation to append attribute definitions to the page description of the electronic document, the attribute definitions corresponding to the visual appearance of the electronic document with the produced data accommodated therein.

15. The method of claim 13, wherein the one or more operations result in a new visual object to overlay one or more pre-existing visual objects in the electronic document.

16. The method of claim 13, wherein the electronic document is a form stored as a portable document format file.

17. The method of claim 16, wherein receiving the request from the client comprises receiving the request from the client in response to information having been entered into a form field of the form.

18. The method of claim 16, wherein the one or more operations includes an operation to add a new field to the form by appending attribute definitions to the page description of the form, the attribute definitions corresponding to at least one of field type, field location, field dimension, field color, or field border.

19. A non-transitory machine-readable storage medium embodying information indicative of commands for causing one or more computer systems to perform functionality comprising:
receiving, at the one or more computer systems, a request from a client to obtain data that is to be imported into an electronic document at the client that is defined by a page description language, the page description language defining a visual appearance for a physical page of the electronic document;
producing, at the one or more computer systems, data corresponding to the request;
generating, by the one or more computer systems, instructions to modify the electronic document, the instructions specifying one or more operations to modify a page description of the electronic document so as to accommodate importation of the produced data into the electronic document, wherein the instructions include a tag that indicates a temporal order in which (i) the produced data is to be imported into the electronic document and (ii) the operations to modify the page description are to be performed; and
transmitting the produced data and the generated instructions to the client, the generated instructions to be performed at the client to modify the page description of the electronic document to accommodate importation of the produced data,
wherein the tag is a before tag or an after tag,
wherein the before tag indicates that the produced data is to be imported into the electronic document before the operations to modify the page description are performed, and
wherein the after tag indicates that the produced data is to be imported into the electronic document after the operations to modify the page description are performed.

20. The non-transitory machine-readable storage medium of claim 19, wherein the one or more operations includes an operation to append attribute definitions to the page description of the electronic document, the attribute definitions corresponding to the visual appearance of the electronic document with the produced data accommodated therein.

21. The non-transitory machine-readable storage medium of claim 19, wherein the one or more operations result in a new visual object to overlay one or more pre-existing visual objects in the electronic document.

22. The non-transitory machine-readable storage medium of claim 19, wherein the electronic document is a form stored as a portable document format file.

23. The non-transitory machine-readable storage medium of claim 22, wherein receiving the request from the client comprises receiving the request from the client in response to information having been entered into a form field of the form.

24. The non-transitory machine-readable storage medium of claim 22, wherein the one or more operations includes an operation to add a new field to the form by appending attribute definitions to the page description of the form, the attribute definitions corresponding to at least one of field type, field location, field dimension, field color, or field border.

25. A system comprising:
a client configured to receive an electronic document, the electronic document being defined by a page description language, the page description language defining a visual appearance for a physical page of the electronic document; and
a server in communication with the client, the server configured to perform functionality including:
receiving a request from the client to obtain data that is to be imported into the electronic document at the client,
producing data corresponding to the request,
generating instructions to modify the electronic document, the instructions specifying one or more operations to modify a page description of the electronic document so as to accommodate importation of the produced data into the electronic document wherein the instructions include a tag that indicates a temporal order in which (i) the produced data is to be imported into the electronic document, and (ii) the operations to modify the page description are to be performed, and
transmitting the produced data and the generated instructions to the client,
wherein the client is configured to perform the generated instructions to modify the page description of the electronic document to accommodate importation of the produced data,
wherein the tag is a before tag or an after tag,
wherein the before tag indicates that the produced data is to be imported into the electronic document before the operations to modify the page description are performed, and
wherein the after tag indicates that the produced data is to be imported into the electronic document after the operations to modify the page description are performed.

26. The system of claim 25, wherein the one or more operations includes an operation to append attribute definitions to the page description of the electronic document, the attribute definitions corresponding to the visual appearance of the electronic document with the produced data accommodated therein.

27. The system of claim 25, wherein the one or more operations result in a new visual object to overlay one or more pre-existing visual objects in the electronic document.

28. The system of claim 25, wherein the electronic document is a form stored as a portable document format file.

29. The system of claim 28, wherein receiving the request from the client comprises receiving the request from the client in response to information having been entered into a form field of the form.

30. The system of claim 28, wherein the one or more operations includes an operation to add a new field to the form by appending attribute definitions to the page description of the form, the attribute definitions corresponding to at least one of field type, field location, field dimension, field color, or field border.

\* \* \* \* \*